United States Patent [19]

Fallert

[11] Patent Number: 4,645,391
[45] Date of Patent: Feb. 24, 1987

[54] WORK SET UP METHOD AND APPARATUS
[75] Inventor: Joe E. Fallert, San Jose, Calif.
[73] Assignee: FMC Corporation, Chicago, Ill.
[21] Appl. No.: 735,024
[22] Filed: May 17, 1985
[51] Int. Cl.$^4$ .............................................. B23Q 3/06
[52] U.S. Cl. ................................ 409/225; 269/289 R; 269/311; 403/322; 408/48; 409/277; 409/903
[58] Field of Search ......... 403/322, 328, 362, DIG. 8; 29/56.5, 56.6, 799, DIG. 101; 409/197, 198, 205, 219–227, 276–278, 344, 903; 269/289 R, 289 MR, 900, 309, 311; 408/1 R, 1 BD, 42, 43, 46, 48, 52, 53

[56] References Cited
U.S. PATENT DOCUMENTS

| | | | |
|---|---|---|---|
| 993,426 | 5/1911 | Whitehead | 409/219 X |
| 1,390,487 | 9/1921 | Black et al. | 269/289 MR |
| 2,816,489 | 12/1957 | Robbins et al. | 269/309 |
| 3,498,653 | 3/1970 | McCreery | 287/119 |
| 3,606,300 | 9/1971 | Davis | 269/309 X |
| 4,073,215 | 2/1978 | Coope et al. | 409/219 |
| 4,090,803 | 5/1978 | Haley | 408/42 X |
| 4,135,418 | 1/1979 | McCray et al. | 82/36 |
| 4,184,669 | 1/1980 | Bald | 269/309 |
| 4,350,463 | 9/1982 | Friedline | 409/234 |

Primary Examiner—Gil Weidenfeld
Assistant Examiner—Steven C. Bishop
Attorney, Agent, or Firm—A. J. Moore; H. M. Stanley; R. B. Megley

[57] ABSTRACT

A work set up method and apparatus is disclosed for use with tape controlled machine tools including quick connect ball locks which accurately lock one or more fixtures and workpieces to a work table. The tape is indexed with one ball lock and controls the machining of the workpiece. The fixture and workpiece may be locked to the table of other tape controlled machines for performing other machining functions on the workpiece. A second embodiment includes a work set up apparatus in combination with a drill holding mechanism and at least one multiple spindle drilling head secured to the vertically movable head of a multiple drilling head machine. Depending upon the complexity and size of the workpiece and the number of drills in the second embodiments, set up time is reduced from a prior art time of between about 4–16 hours to between about 5–20 minutes in accordance with the present invention.

20 Claims, 17 Drawing Figures

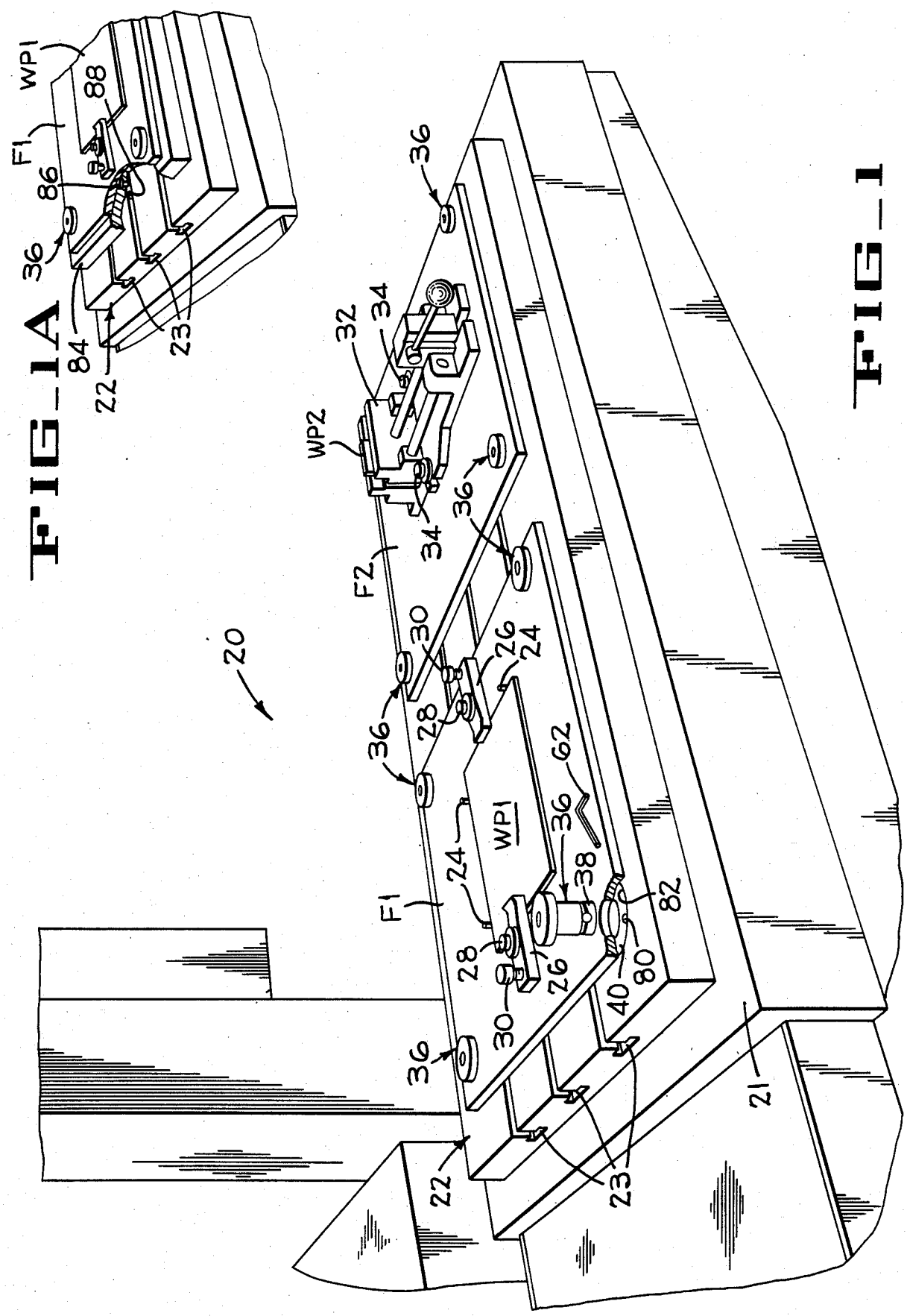

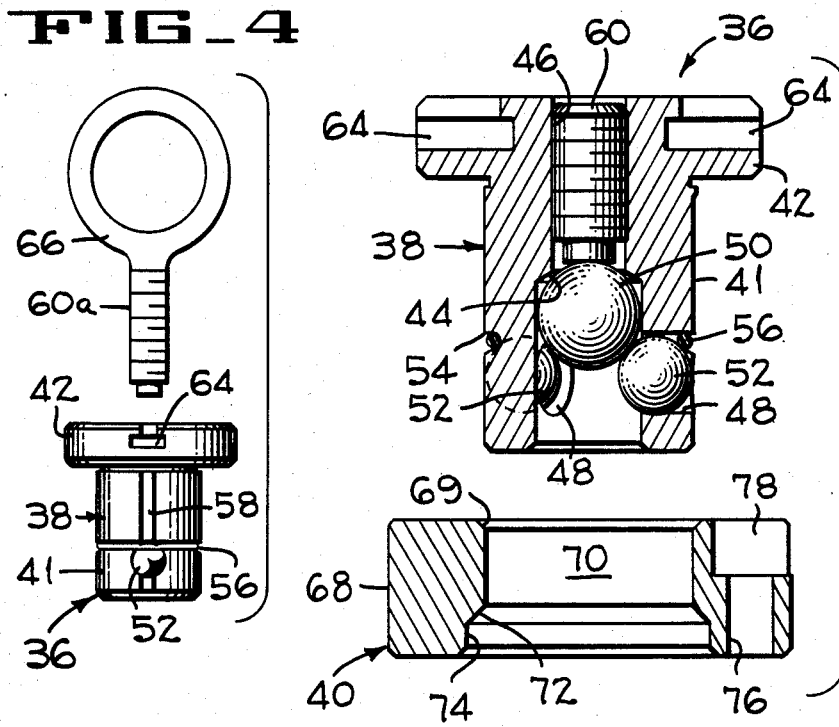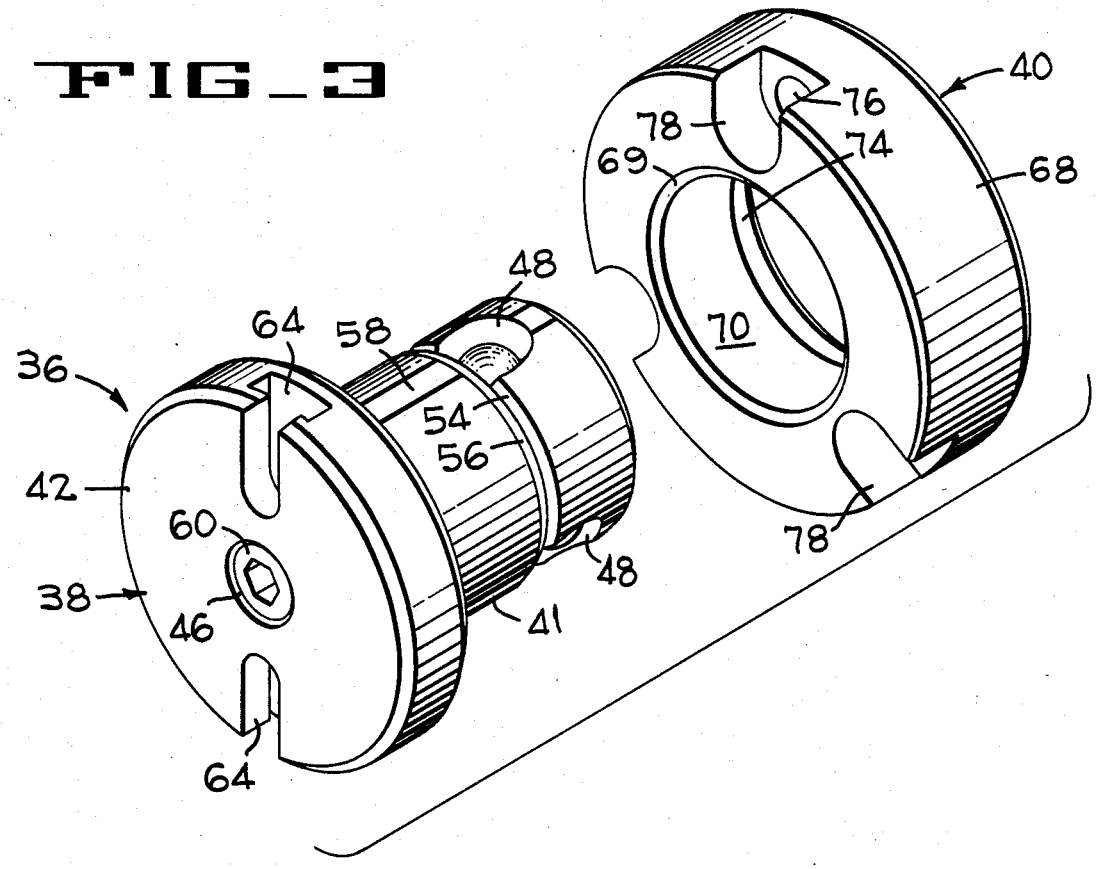

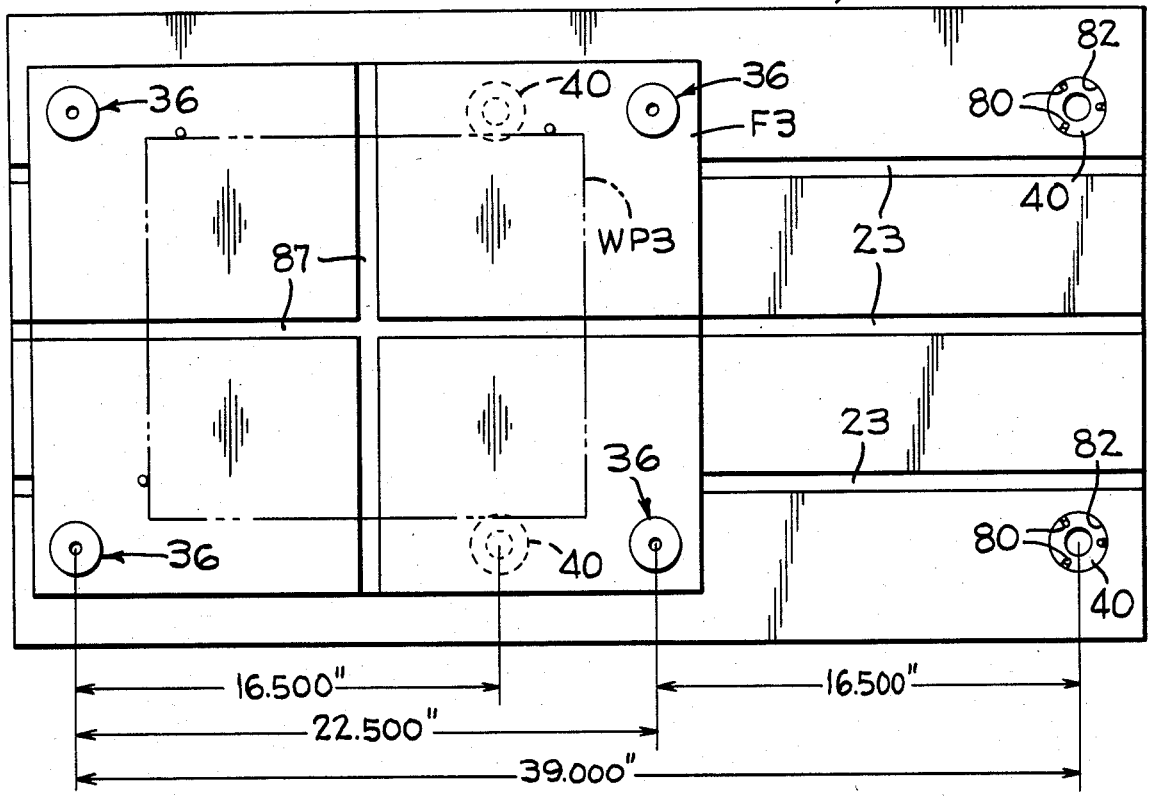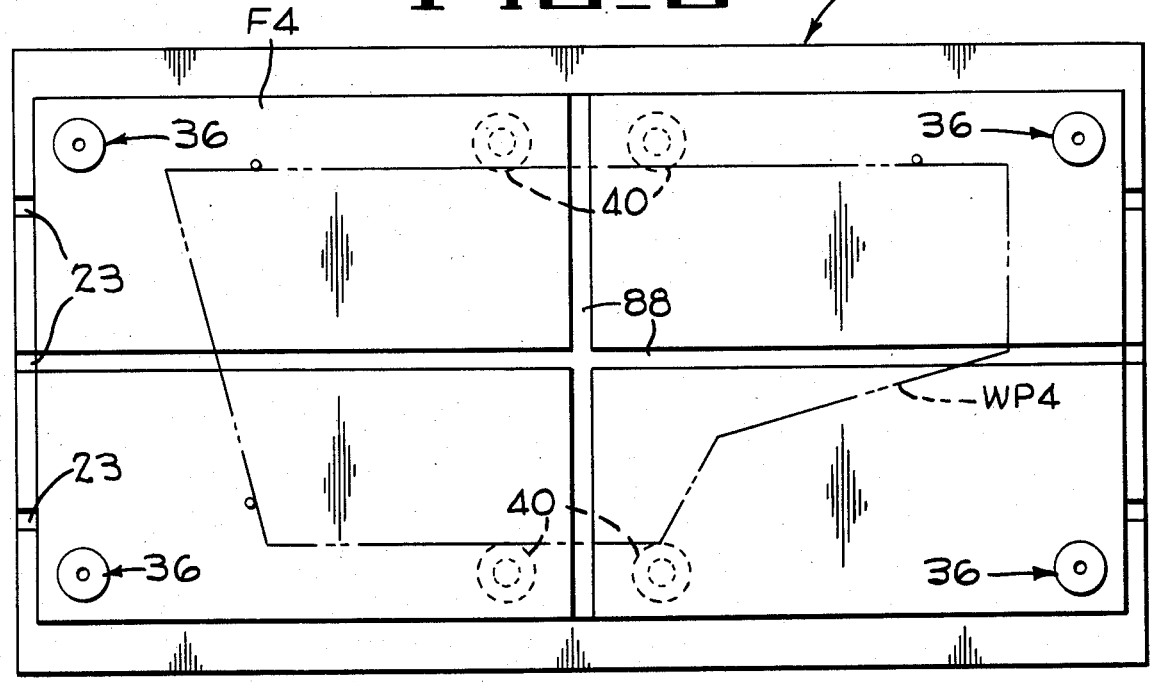

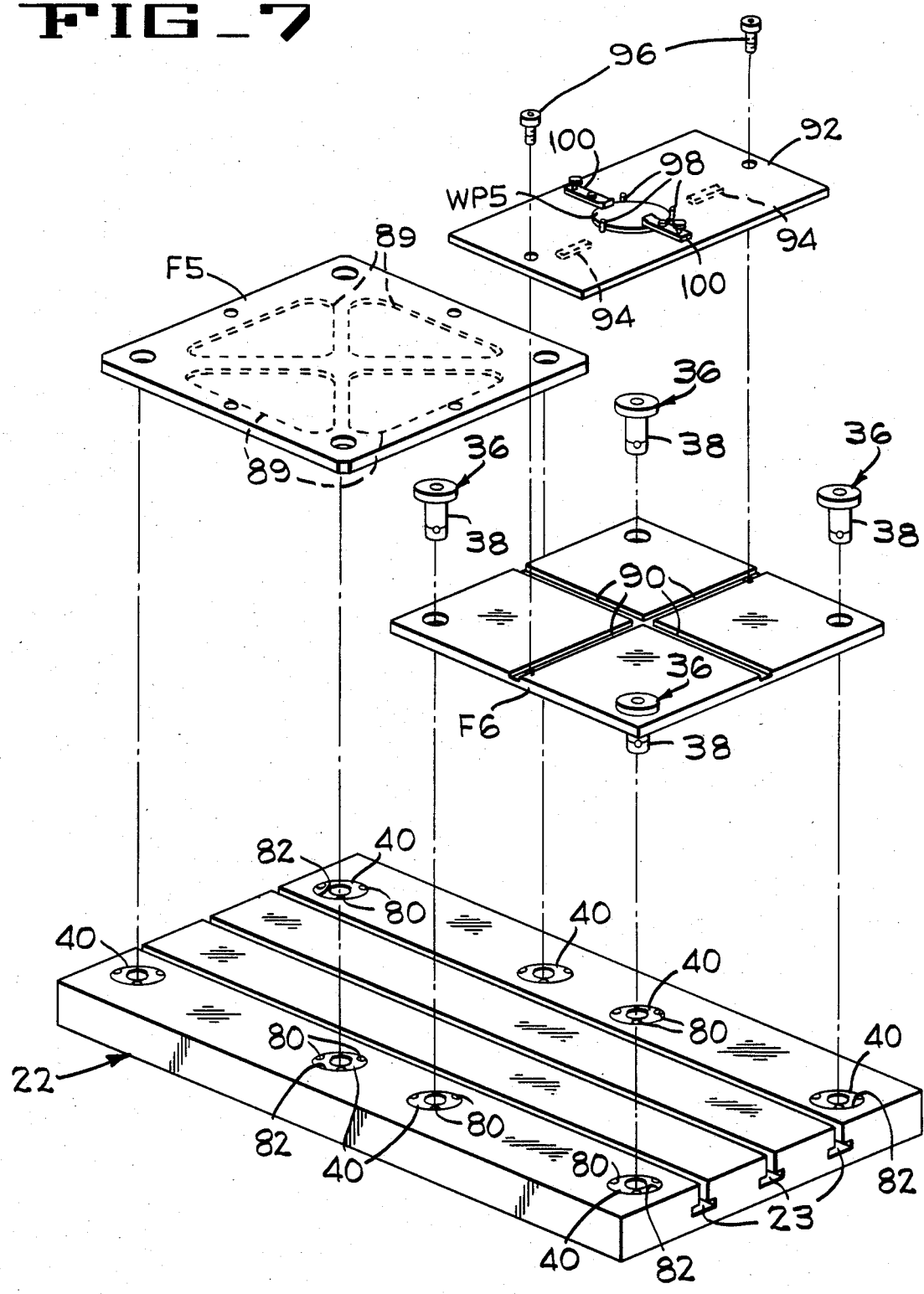

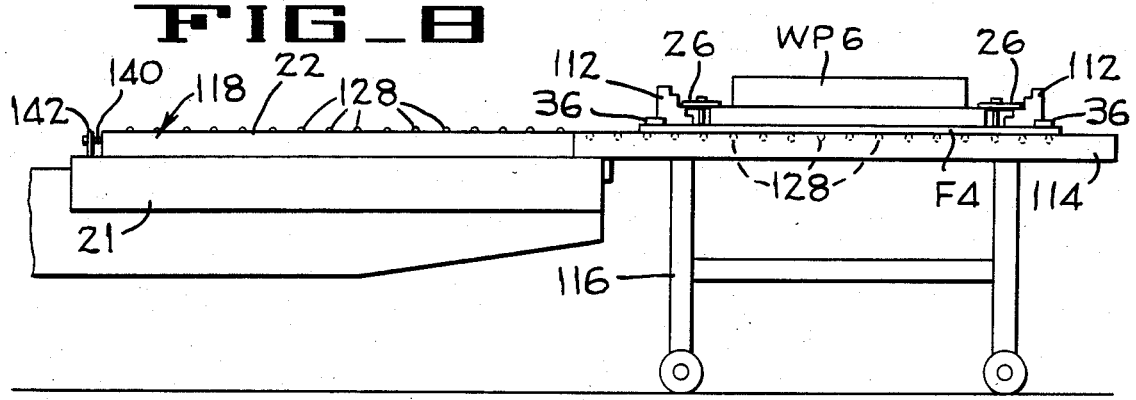
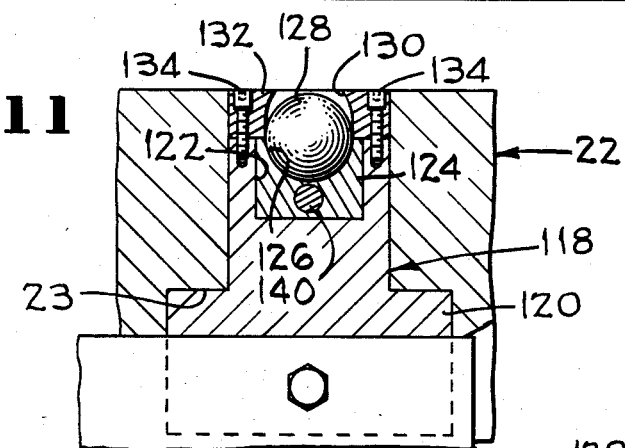
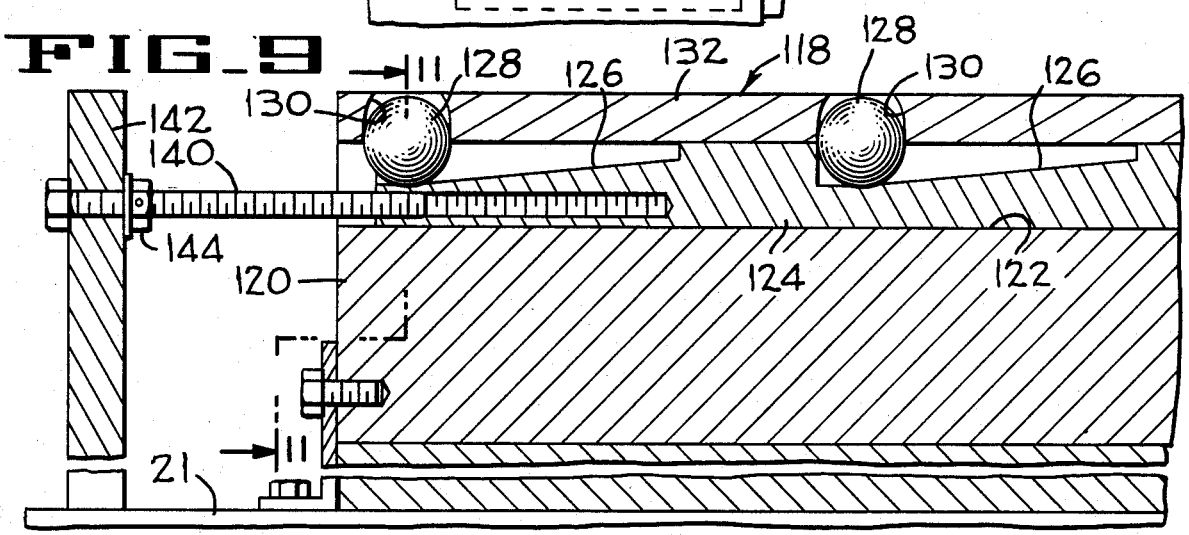
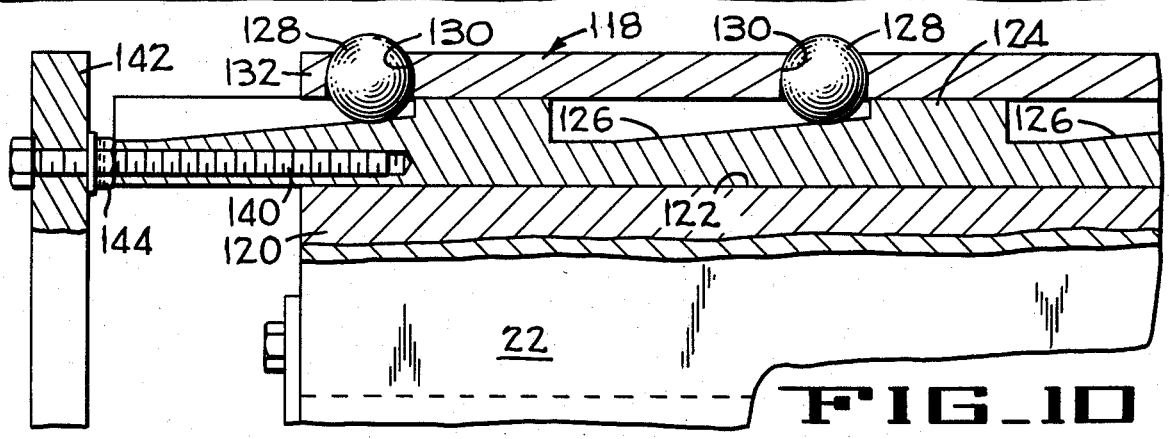

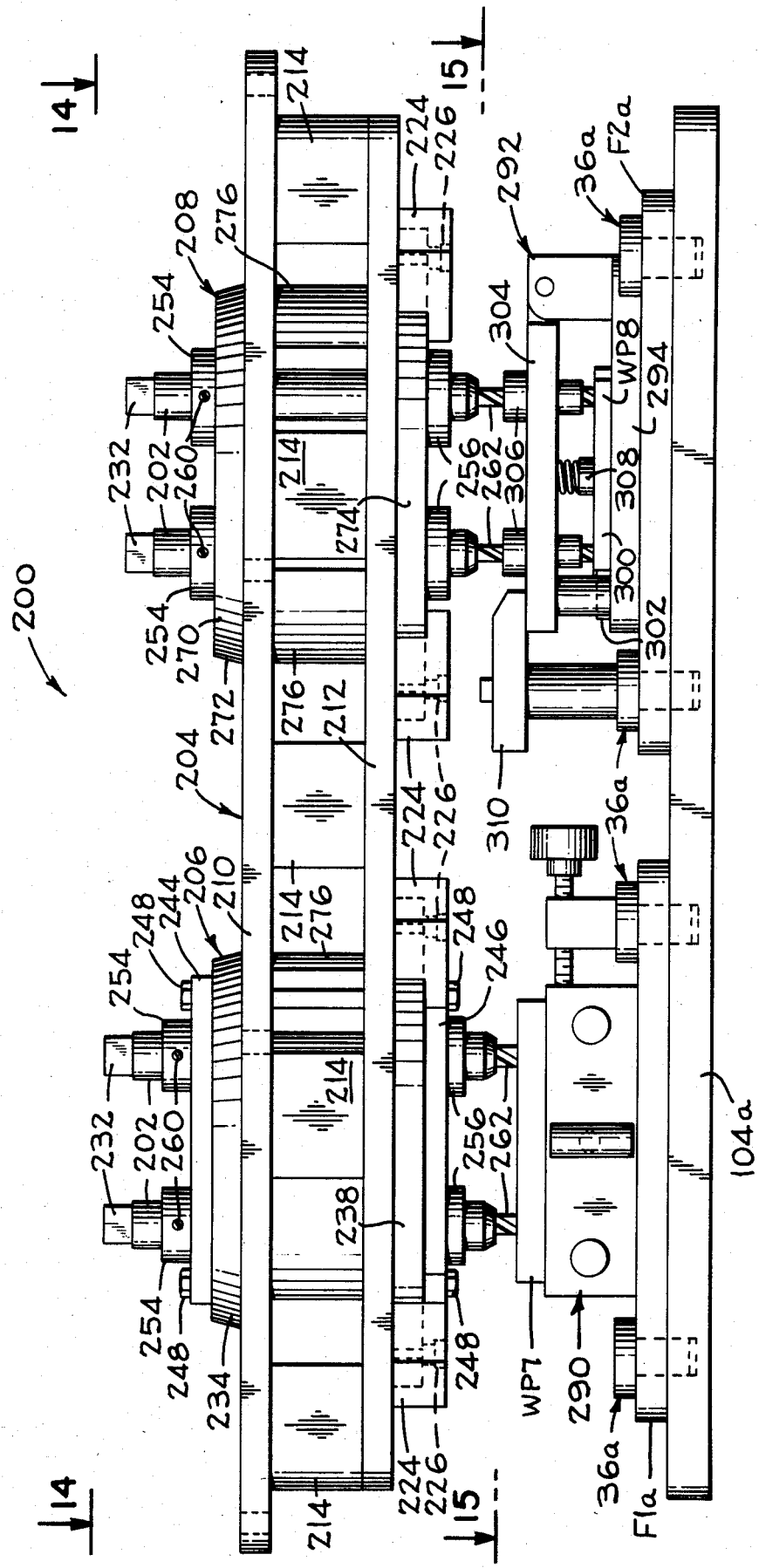
FIG_12

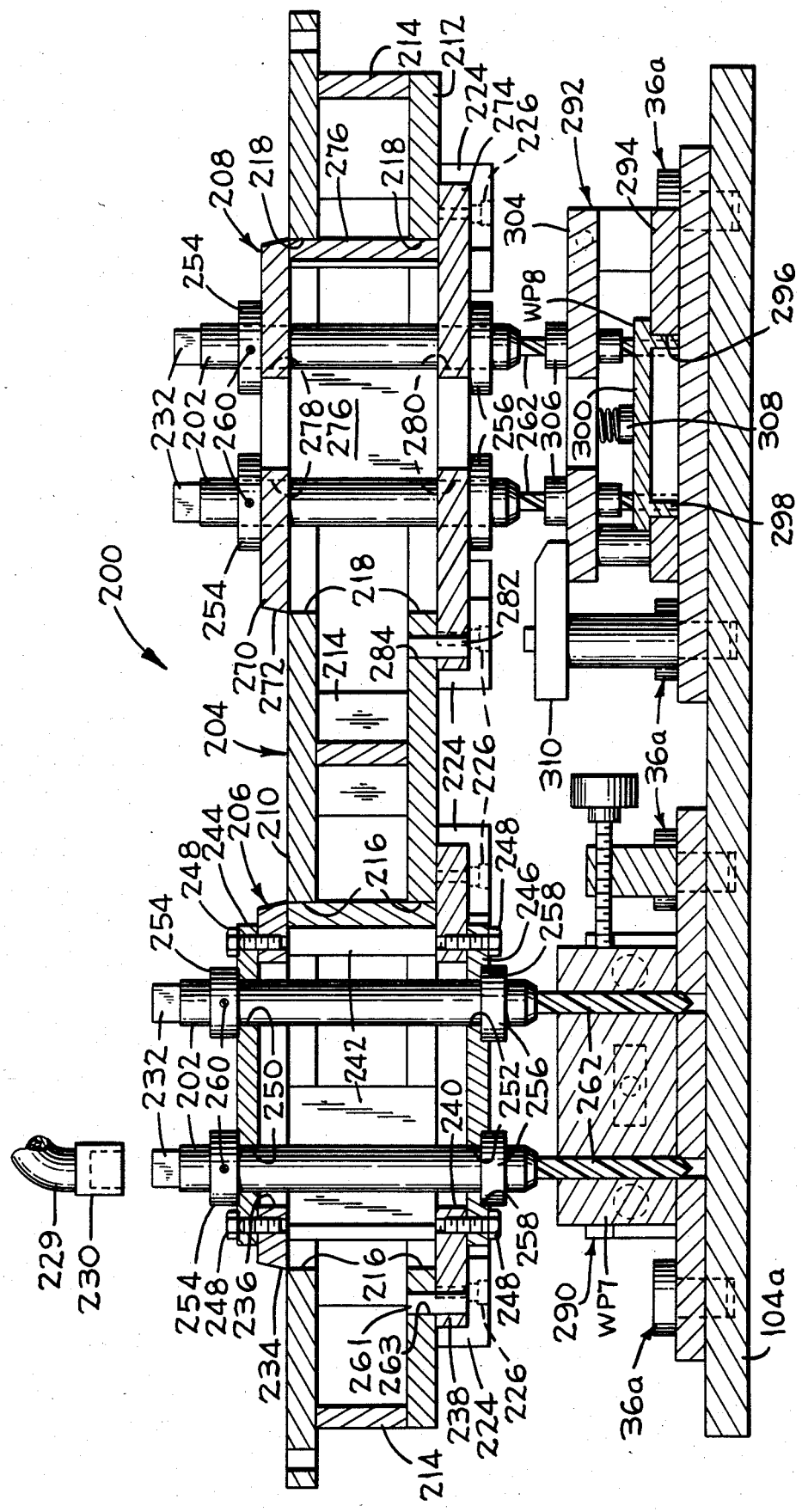

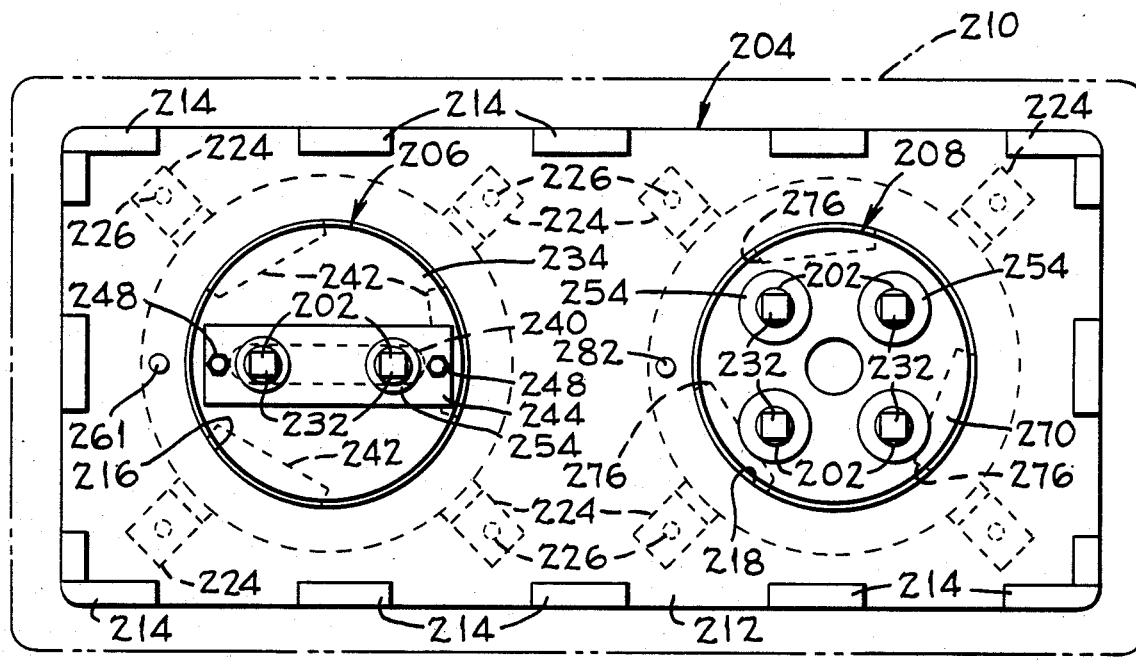
FIG_14
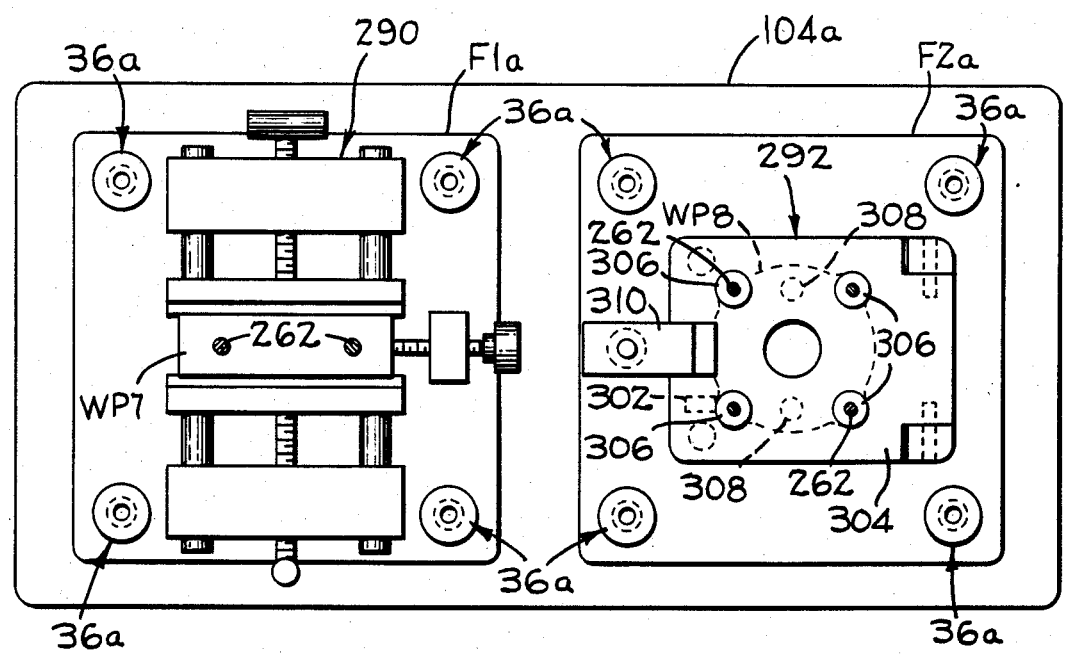
FIG_15

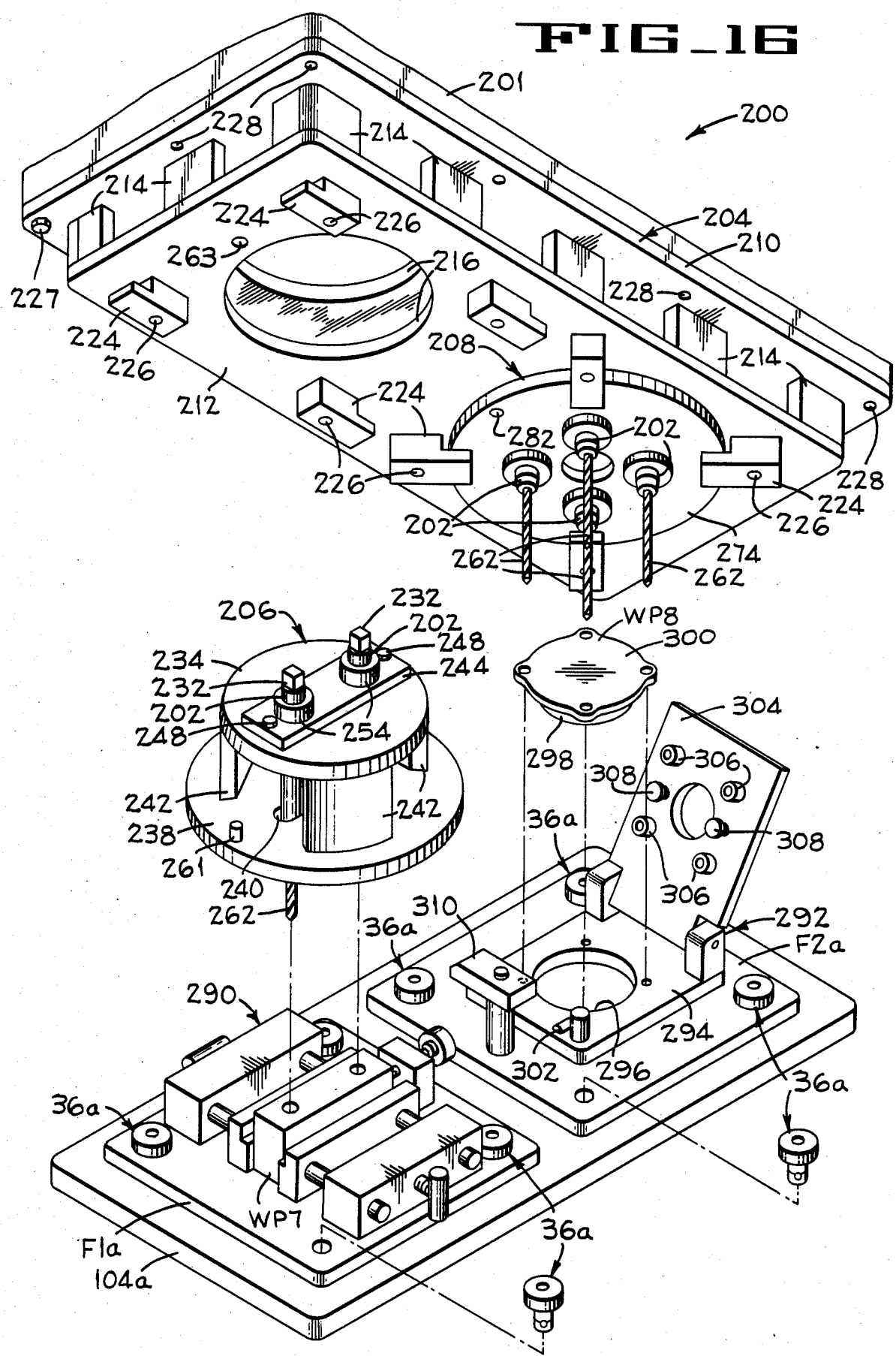

WORK SET UP METHOD AND APPARATUS

BACKGROUND OF THE INVENTION

1. Field of the Invention

The present invention relates to method and apparatus for improving the productivity of machine shops by minimizing work set up time and more particularly relates to a method and apparatus for quickly and accurately attaching a fixture and workpiece to the work tables of one or more machine tools.

2. Description of the Prior Art

Large machine shops have many different types of machine tools which may be manually controlled or may be automatically controlled by machining instructions placed on tapes, disc, micro processors, and computers or the like. As used herein, the term "tape" will be understood as including other automatic machine tool controllers. If automatically controlled, each tape has an indexing point thereon which is aligned with an indexing point on the work table of the specific machine being used before operating the machine. The machine tool operator then mounts the workpiece on the table with or without the aid of a jig such as a vice and then manually positions and locks the workpiece and/or jig on the table by conventional T-nuts, bolts and clamping fingers. Considerable productive machining time is lost because the above set up procedures require a considerable amount of time to accurately position the work piece and/or jig on the table and to then accurately clamp work pieces to the table at a location that is indexed with the indexing point on the work table.

U.S. Pat. No. 3,498,653 which issued to McCreery on Mar. 30, 1970 and U.S. Pat. No. 4,135,418 which issued to McCray et al on Jan. 23, 1979 disclosed ball locks for mounting tools in turrets or the like.

SUMMARY OF THE INVENTION

The method and apparatus of the present invention considerably reduces the workpiece set up time by accurately locking a fixture and the workpiece to the table by a plurality of ball locks which are received in accurately positioned holes counterbored in the table (or in an intermediate ball lock plate that is rigidly secured to the table as by bolting). The axis of one of the female portions of the ball locks preferably acts as a table indexing point upon which the tape is indexed. The ball locks have a repeatability accuracy of 0.002 of an inch radius by maintaining the position of a batch of workpieces being worked on by the machine tool within said 0.002 of an inch from exact alignment in all directions.

BRIEF DESCRIPTION OF THE DRAWINGS

FIG. 1 is a perspective of a portion of a metal working machine illustrating its work table with two short fixtures and workpiecees connected thereto by ball locks, certain parts being cut away and one of said ball locks being disconnected.

FIG. 1A is a perspective of a portion of the apparatus of FIG. 1, with a ball lock base bolted to the work table and bored to receive the female portion of the ball locks.

FIG. 2 is a central section taken through a ball lock.

FIG. 3 is an enlarged perspective of the ball locks with the male and female components thereof separated.

FIG. 4 is a side elevation of the male portion of the ball lock illustrating a modified form of its ball engaging actuator.

FIG. 5 is a plan of an intermediate sized fixture secured to a work table, which fixture is longitudinally and transversely slotted to receive and accurately position a standard prior art jig or a workpiece thereon, which workpiece is illustrated in phantom lines.

FIG. 6 is a plan similar to FIG. 5 but illustrating a long fixture adapted to receive a non-symmetrical workpiece thereon, which workpiece is illustrated in phantom lines.

FIG. 7 is an exploded perspective illustrating a conventional work table having the female portions of ball locks secured thereto, and further illustrating two types of short fixtures and a conventional jig with a workpiece clamped thereto.

FIG. 8 is a diagrammatic side elevation of the work table of a machine tool and a cart with a heavy workpiece and fixture supported thereon, said work table and cart having T-track transferred devices therein.

FIG. 9 is an enlarged central section taken through a portion of the T-track transfer device of said work table illustrating the balls in their lower non-supporting position.

FIG. 10 is a section similar to FIG. 9 but illustrating the balls of the transfer device in a raised fixture supporting position.

FIG. 11 is a section taken along lines 11—11 of FIG. 9.

FIG. 12 is a diagrammatic side elevation of a modified form of the invention illustrating a drilling jig having six drills useable with a multiple drilling head machine with two workpieces secured to fixtures secured to a work table.

FIG. 13 is a vertical central section through the apparatus of FIG. 12.

FIG. 14 is a plan view with top plate removed but shown in phantom lines, said view being taken at a smaller scale looking in the direction of arrows 14—14 of FIG 12.

FIG. 15 is a horizontal section taken along lines 15—15 of FIG. 12.

FIG. 16 is an exploded perspective of the drilling jig of FIG. 12.

DESCRIPTION OF THE PREFERRED EMBODIMENT

The work set up apparatus 20 (FIG. 1) of the present invention is adapted to be used with conventional machine tools such as drilling machines, shapers, planers, milling machines, certain types of lathes and other material working machines. Each of the machine tools includes a frame 21 which supports or is associated with a work table 22 having T-slots 23 therein to which a workpiece WP (or in some cases a portion of the machine tool) is rigidly secured at a predetermined position on the table 22. The workpieces WP are preferably metal but may be plastic, wood, or other materials such as composite materials if desired.

Although the apparatus 20 is useable with the above referred to prior art machine tools, it will be understood that the apparatus 20 may also be used with other machines such as robot controlled welders or the like that are associated with work tables 22 upon which a workpiece can be clamped. Thus, the term "machine tools" as used herein and in the claims is to be construed broadly enough to cover robot operated machines or the like. It is also apparent that the need for expensive T-slots in work tables is obviated by the present invention and that the term work table as used herein and in the claims covers plates without T-slots therein unless T-slots are specifically mentioned in the claims.

Having reference to FIG. 1, two fixtures F1 and F2 are supported on the work table 22 with a first workpiece WP1 aligned on the fixture F1 by pins 24 and firmly held in place by clamps 26 secured to the fixture F1 and capscrews 28,30. The workpiece WP2 is clamped in a vise 32 that is rigidly secured to fixture F2 by capscrews 34.

An important feature of the invention is that the fixtures F1 and F2 are rigidly secured to the work table 22 by a plurality of ball locks 36. Each ball lock 36 (FIGS. 2 and 3) comprises a male portion 38 and a female portion 40. The male portion 38 includes a cylindrical body 41 and a cylindrical flange 42 which are bored axially to provide a large diameter ball seat 44 and a threaded small diameter portion 46. A plurality of radial bores 48, three being shown, are formed through the cylindrical body 41 and communicate with the large diameter ball seat 44. A large diameter ball 50 is loosely received in the ball seat 44 and small balls 52 are loosely received in each radial bore 48, with each small ball disposed in position to engage the large ball 50. A circumferential groove 54 is formed in the periphery of the cylindrical body 41 and receives a resilient O-ring 56 which engages outer surfaces of the small balls 52 and resiliently resists radial outward movement of the balls 52.

As best shown in FIG. 3, flats 58 are ground in the surface of the cylindrical body 41 in alignment with the balls 52 to permit slight radial movement of the cylindrical body when being locked in the female portion 40, and to provide passages through which air may escape when the male portion 38 is inserted in the female portion 40 due to small clearance between the male and female portions. A threaded ball actuating element 60, illustrated as an Allen head set screw in FIGS. 2 and 3, is threaded into the threaded portion 46 of the male portion 38 with the aid of an Allen wrench 62 (FIG. 1). Undercut T-shaped slots 64 are cut into the periphery of the cylindrical flange 42 for receiving a tool for assisting the operator to assemble and disassemble the male portion 38 from the female portion 40.

FIG. 4 illustrates the male portion 38 of the ball lock 36 with an alternate form of the threaded ball actuating element 60a, which element 60a is in the form of an eye-bolt 66 which may be tightened or released by a screw driver, bar, or similar tool. It is apparent that the eye-bolt 66 obviates the need of the slots 64, thus the female portion 40 may be provided with or without the slots 64 when an eye-bolt is used.

The female portion 40 (FIGS. 2 and 3) is in the form of a ring 68 having a chamfered upper edge 69 and a cylindrical guiding surface 70 for guiding the male portion 38 into the female portion 40. A large diameter frusto-conical ball engaging surface 72 communicates with the surface 70 and with a cylindrical ball engaging surface 74. The ring 68 is provided with holes 76 and relieved portion 78 for receiving the body and heads of bolts 80 (FIGS. 1 and 7) used to lock the female portion 40 into counterbored holes 82 in the work table 22.

In order to avoid boring the large holes 82 (about 2¾ inches D) in the work table 22 to receive the female portions 40, a separate mounting plate 84 (FIG. 1A) may be connected to the work table 22 by a plurality of bolts 86 (only one being shown) received in shouldered holes in the mounting plate 84 and screwed into T-nuts 88 in the T-slots 23 of the work table 22. The female portions are fitted in bores (not shown) in the mounting plate 84.

As mentioned previously, a plurality of different types of machine tools in a machine shop may be required to perform different functions on a single complicated work-piece such as a complicated casting. The functions may include drilling, shaping, planing, milling and welding thereby requiring movement of the fixture, such as fixture F1 with its workpiece WP1 clamped thereon to a plurality of separate machine tools. The size of the smallest fixture F2 is therefore determined by the size of the smallest work table of the group of machines being used to machine the particular workpiece WP2. For example, the smallest work table in a machine shop may accommodate a fixture that is no larger than about 20 inches times 20 inches which is the size of each of the fixtures F1,F2 illustrated in FIG. 1. Each of these fixtures F1,F2 have a center-to-center spacing of the ball lock holes of 16.500"×16.500". FIG. 5 illustrates a medium size work table 22 with a medium size fixture F3 having a center-to-center spacing of the ball lock holes of 16.500"×22.500" and is capable of handling a longer workpiece such as workpiece WP3. FIG. 6 illustrates a large fixture F4 having a center-to-center spacing of the ball lock holes of 16.500"×39.000" and is capable of handling a still larger workpiece WP4. The fixtures F3 and F4 have key way slots 87 and 88 therein for purposes to be described hereinafter.

The tables 22 of FIGS. 1 and 7 are bored to receive the female portions 40 of eight ball locks 36, with the two 20"×20" fixtures being illustrated. However, the spacing of the female portions 40 are such as to accommodate two of the 20"×20" fixtures, or one medium size fixture F3 (FIG. 5), or one long fixture F4 (FIG. 6) without requiring any additional female portions 40 to be mounted on the work table. Longer work tables can, of course, accommodate other numbers and/or patterns of fixtures or fixtures having center-to-center distances that are different from the above described ball lock spacings.

FIG. 7 illustrates a fixture F5 having four shallow indentations 89 formed in the lower surface thereof for isolating the hold down forces applied by the ball locks to the adjacent corners of the fixture F5. A second fixture F6 is illustrated in FIG. 7 and has four key way slots 90 in its upper surface which slots are the same width as the upper portion of each T-slot 23 in the work table 22. A jig 92 having a pair of keys 94 welded on the lower surface thereof is secured to the fixture F6 by capscrews 96 with the keys 94 in two of the slots thus accurately positioning a workpiece WP5 on the jig 92. The workpiece WP5 is held on the jig by pins 98 and clamps 100. It will be understood that the key way slots formed in the fixtures F3,F4 and F6 are formed therein to accommodate prior art jigs, similar to the jig 92 (FIG. 7) which heretofore were bolted directly to the work table 22 with the aid of capscrews 96 and T-nuts 88 (only one shown in FIG. 1A) fitted in the appropriate T-slot 23 of the work table 22.

Each ball lock 36 used to clamp one of the fixtures F1-F6 onto the work table provides about 40,000 foot pounds of force in response to about 33 foot pounds of tightening force of the ball locks with the aid of an Allen wrench 62 or the like. Thus, the ball locks 36 rigidly clamp the fixture to the work table 22 with a repeatable accuracy of at least about 0.002 of an inch.

Thus, the maximum error due to setting up the fixture and workpiece is less than 0.002 of an inch in any direction.

If a very heavy workpiece such as a heavy cast workpiece WP6 (FIG. 8) is to be aligned and locked to the work table 22 of any one of a plurality of machine tools, the workpiece WP6 is first mounted on and is fixed to an appropriately sized fixture, such as fixture F4 (FIGS. 6 and 8), by means of clamps or the like, such as clamps 26 aided by conventional step locks 112.

The heavy workpiece WP6 and the fixture F4 to which it is clamped is then lifted by a shop crane or the like and placed on a table 114 having T-slots (not shown) therein, but similar to the T-slots 23 (FIG. 1) in the work table 22. The table 114 (FIG. 6) forms the top surface of a mobile cart 116 which may be pushed into alignment with the work table 22.

In order to minimize the efforts involved in transferring the workpiece WP6 and fixture F4 from the cart 116 onto the work table 22, or vice versa, and to align the fixture with a work table in position to receive the ball locks 36, a T-track transfer device 118 is mounted within each T-slot 23 in the table 22 and in similar T-slots (not show) of the cart table 114.

Each T-track transfer device 118 comprises an elongated T-shaped bar 120 with a channel 122 formed in its upper surface which slidably receives a slide bar 124 having a plurality of inclined steps 126 formed in the upper surface thereof. The upper surfaces of the steps 126 are arcuate in cross-section as shown in FIG. 11, and the steps may be constructed from steel or a synthetic material such as nylon if the weight of the workpiece is such as to cause ball friction problems. A fixture supporting ball 128 rests on each of the steps 126 and each ball is received in a frusto-spherical bore 130 formed in a cover plate 132 that is connected to the T-shaped bar 120 by capscrews 134. The upper portion of each ball is cradled in the associated frusto-conical hole 130.

As best shown in FIGS. 9 and 10, one end of the slide bar 124 is internally threaded and receives an adjustment bolt 140 which is rotatably received in a hole in a bracket 142 secured to the frame 21 of the machine tool. A nut and washer 144 are rigidly connected to the bolts 140 adjacent the bracket 142 to permit rotation of the bolt relative to the bracket 142 and prevent axial movement of the bolt relative to the bracket. Thus, rotation of the bolt with the aid of a wrench or an air or hydraulically operated tool or the like will cause the steps 126 of the slide bar 124 to move between a position wherein the balls 128 are below the upper surface of the cover plate 132 as shown in FIG. 9; and a position wherein the upper surfaces of the balls 128 project above the cover plate 132 (FIG. 10) and thus support the fixture F4 (FIG. 8) and its workpiece WP6 on the balls 128 thus making it much easier to accurately and quickly maneuver the fixture with its load into position to be locked to the work table 22 by the ball locks 36.

Although the operation of the work set up apparatus has been covered during the description of the apparatus, a brief summary of the operation will follow.

When a workpiece, such as workpiece WP1 (FIG. 1) is to be machined by one or more machine tools, the workpiece is first clamped on a fixture, such as fixture F1. The operator then places the fixture on the work table and aligns one hole therein with the associated female portion 40 of the ball clamp and drops the male portion 38 through the hole and into the female portion.

The operator then pivots the fixture F1 about the male portion until the three other holes in the fixture are aligned with the associated female portions 40. The three male portions are then inserted into the associated female portions. The operator then tightens the ball locks 36 with a tool such as the Allen wrench 62 which provides a 40,000 foot pound locking force for each ball lock 36 with a repeatable accuracy of about 0.002 of an inch as previously mentioned. The machine tool tape (or floppy disk) is then indexed with one of the ball locks 38 preferably the left front ball lock, and the machining operation is then automatically controlled by the tape or floppy disk. It will be understood that the tape may be programmed to receive dual machining and indexing instructions so that two workpieces, for example workpieces WP1 and WP2 (FIG. 1) may be machined at the same time and at different rates. The two programs may be independently indexed with preselected points on the fixture such as the axes of the left front ball locks of fixtures F1 and F2. Both, or only one program, may be used by selective operation of electrical switches.

The programs on the tape are preferably permanently stored on floppy disks for use over long periods of time.

After the machining operation has been completed on workpiece WP1, the clamps 26 may be released, the finished workpiece may be removed and other workpieces WP1 may be locked to the fixture F1 one at a time, with the aid of the pins 24 and clamps 26. Alternately, if other machining operations are to be performed on the same workpiece WP1, the partially machined workpiece and the fixture F1 are quickly removed from the first machine tool by releasing and removing the male portions of the ball locks 36, and the fixture F1 and its partially machined workpiece are then removed as a unit from the first machine tool and are locked to the work tables of as many other machine tools as needed by ball locks to complete the machining operation on the workpiece.

Tests have been conducted to compare the set up time using the present invention relative to that used with prior art set up practices, and it has been determined that set up times of the simple FIG. 1 fixtures and workpieces require about ten minutes with the present invention while prior art set up times would require about one and one-half to two hours.

A second embodiment of the work set up apparatus 200 (FIGS. 12–16) of the present invention is useable with a multiple drilling head machine having a vertically movable head 201 (only a fragment being shown in FIG. 16) which may have up to about 72 adjustable drills spindle drive means thereon.

As illustrated in FIGS. 12–16, the apparatus 200 of the present invention includes only six drill spindles 202. The apparatus 200 includes a drill head holding mechanism 204 which removably supports a first multiple spindle drilling head 206 with two drilling spindles 202 therein and a second drilling head 208 having four drilling spindles 202 therein. The illustrated apparatus 200 also includes two fixtures F1a and F2a locked to a ball lock base 104a by ball locks 36a. The ball lock base 104a may be secured to the work table (not shown) of the multiple drilling head machine in the same manner as disclosed in relation to the first embodiment of the invention.

The drill holding mechanism 204 (FIGS. 13 and 16) comprises an upper plate 210 and a lower plate 212 that are rigidly connected together by a plurality of legs 214.

Axially aligned holes 216 are accurately machined in the plates 210,212 to receive the first drilling head 206; and a second pair of aligned holes 218 are formed in plates 210,212 to receive the drilling head 208. A plurality of drilling head locks are illustrated as locking fingers 224 which are supported by the lower plate 212 by shouldered capscrews 226 or the like for movement between a position locking the drilling heads 206,208 to the drill holding mechanism 204 as shown at the right in FIG. 16, or to release the heads as illustrated at the left of FIG. 16. Although manually operated locking fingers are illustrated, it will be understood that hydraulically or electrically operated head locking means may be provided if desired. Alternately a plurality of ball locks similar to but smaller than the ball locks 36 may be used with the female member being secured to the drill head holding mechanism 204.

It will be understood that the drill holding mechanism 204 and the two drill heads 206,208 are rigidly connected to the vertically movable head 201 of the multiple drilling head machine by capscrews 227 (only one being shown in FIG. 16) which extend through holes 228 in the mechanism 204 and are screwed into the head 201. A plurality of flexible drive shafts 229 (only one being shown in FIG. 13) are driven by the machine and have snap on sockets 230 on their other ends which are connected to mating portions of the spindles illustrated as square end portions 232.

The first drill head 206 comprises an accurately machined circular top plate 234 having an elongated slot 236 (FIG. 13) therein, and a circular bottom plate 238 having an elongated slot 240 therein. The top plate and bottom plate are rigidly connected together by a plurality of arcuate legs 242, three being illustrated in FIG. 16. Two spindle spacers 244,246 are removably mounted on the top plate 234 and bottom plate 238, respectively, by capscrews 248 or the like. Two drill spindles 202 are positioned in holes 250,252 in the spindle spacers 244,246 and are locked in place by upper collars 254 and lower collars 256, which lower collars may be positioned in counterbores 258 thereby more accurately aligning the spindles with the axes of the pairs of holes 250,252. The upper collars 254 are removably attached to the spindles by set screws 260 so that the collars and heads can be removed from, or attached to, the drilling head 206. In order to accurately align the drill head 206 with the drill holding mechanism, a pin 261 (FIG. 16) is secured to the bottom plate 238 and is received in an alignment hole 263 in the bottom plate 212 of the drill head holding mechanism 204.

When a different spacing between the two drilling spindles is required, the two spindle spacers 244,246 are removed and other spindle spacers with the holes having the desired spacing therebetween are substituted for the original spacers 244,246 for mounting the two spindles 202 at any desired spacing permitted by the length of the slots 236,240. Drill bits 262 or the like are chucked in the spindles 202.

The drilling head 208 is illustrated as a non-adjustable head and comprises an upper circular plate 270 having upwardly and inwardly beveled edges 272 to aid in assembling the head within the holes 218 (FIG. 13) in the drill holding mechanism 204. The upper plate 270 is rigidly connected to a lower circular plate 274 by a plurality of legs 276 (FIG. 14) as by welding. The drilling head 208 is illustrated as receiving four drilling spindles 202 removably received in vertically aligned upper holes 278 in the plate 270 and holes 280 in the lower plate 274. Each drilling spindle has a lower collar 256 secured thereto and is first inserted through the associated holes 280,278, and is then locked in operative position in the drilling head 208 by associated collars 254 and set screws 260. Each spindle 202 has the desired cutting tool, for example, drill bits 262, chucked therein; and the head 208 is then moved upwardly into the drill holding mechanism 204 and is locked in operatively position by locking fingers 224 as best shown in FIG. 16. An aligning pin 282 secured to the lower plate 274 enters a hole 284 in the bottom plate 212 of the drill head holding mechanism 204.

As best shown in FIG. 16, the fixture F1a supports a centering vise 290 for clamping a workpiece WP7 illustrated as a rectangular block, in a fixed position for drilling by said first drilling head 206. The fixture F2a supports a pivotal clamp 292 having a base plate 294 rigidly secured to the fixture F2a. The base plate 294 has a cylindrical hole 296 therein which receives a cylindrical portion 298 of a workpiece WP8 which is illustrated as being a bearing cap having a non-circular cover 300 with ears thereon. When placed in drilling position the cylindrical portion 298 is placed within the hole 296 and one of the ears is rotated into engagement with an aligning stop 302 (FIG. 16). A hold down cover 304 is pivotally connected to the base 294 and includes four drill guides 306 and two resilient hold down buttons 308. After the workpiece WP8 is placed in drilling position in the base plate 294, the cover 304 is pivoted closed, and is latched in clamping engagement against the workpiece by a latch 310 pivotally supported by the base plate 294.

During operation of the second embodiment of the invention the two workpieces WP7 and WP8 are first clamped in their fixtures F1a and F2a. The fixtures are, of course, locked by the ball locks 36a to the stationary ball lock base 104a as previously described. The drilling spindles 202 are each connected to associated flexible drive shafts 229 and sockets 230, only one being shown in FIG. 13, and are driven by the multiple drilling head machine in a manner well known in the art.

The operator then controls the multiple drilling head machine in a conventional manner to lower the drill head holding mechanism 204 thereby drilling both workpieces WP7 and WP8 and then raises the mechanism 204 and drills 262 above the workpiece. The operator then unclamps the two drilled workpieces WP7 and WP8, and manually removes them from the clamps 290,292 and places them in containers. He then clamps the new workpieces WP7 and WP8 in the clamps 290,292 and repeats the drilling process.

After the batch of workpieces have been drilled, the operator then releases the flexible drive shafts 229 from the drill spindles 202 and quickly removes the drilling heads 206,208 from the drill head holding mechanism 204 by pivoting the locking fingers 224 to their released position and thereafter pulls the heads free from the head holding mechanism 204. The operator then places different drilling heads, with drilling spindles oriented to drill different workpieces, in the mechanism 204 and pivots the fingers 224 into their locking positions to lock the new heads in place. The operator then clamps the flexible drive shafts 229 (FIG. 13) to the associated drilling spindles 202.

The operator then removes the fixtures F1a and F2a from the ball locking base 104a by first unlocking and removing the ball locks 36a and thereafter locks new fixtures adapted to receive the new workpieces onto the ball locking base 104a. The drilling head machine is then set up to work on a new batch of workpieces which require different drilling functions as compared to the above described workpieces WP7 and WP8. Although the ball locks 36a are illustrated as being secured to the ball locking base 104a, it will be understood that the fixtures F1a and F2a may be clamped directly to the work table (not shown) of the multiple drilling head machine in a manner similar to that illustrated in FIGS. 1 and 7.

The set up time of the above described second embodiment of the invention requires between about five to six minutes to change the fixtures plus about one minute per spindle when all spindles are within about a 12" diameter circle, as compared to about four to five hours required to set up a prior art multiple drilling head machine to perform the same drilling operation. If drilling heads are provided for drilling larger pieces of about two feet in diameter, the set up time about 15-20 minutes as compared to about 12-16 hours with the prior art machines.

Although drilling bits 262 are shown chucked in the drill spindles 202, it will be understood that other rotary cutting tools may be chucked in and driven by the drill spindles. For example, end mills, straight or tapered reamers, counter sinks and other similar cutting tools may be chucked in the drill spindles.

Two drilling heads 206 and 208 are shown secured within the drill holding mechanism 204, however, it will be understood that it is within the scope of the invention to provide holding mechanisms of different shapes and sizes for removably supporting one large drill head and a plurality of drill spindles arranged in different patterns for performing the desired work on one or more workpieces.

An important advantage of the method and apparatus of the present invention over that of the prior art is that the cost of manufacturing single, or small batches, of workpieces is economically justified when practicing the present invention since the set up time is only a few minutes; whereas the prior art set up time of about 4 to 16 hours economically prohibits working single or small batches of parts and thus the prior art machines are usually set up to handle batches of hundreds and thousands of parts.

Although several machine tools which perform cutting actions on the workpiece have been mentioned, it will be understood that the term "machine tools" as used in the claims cover other machines which are associated with work tables such as tape controlled robots which perform welding or other operations on workpieces.

From the foregoing description it is apparent that the work set up method and apparatus of the present invention is directed to the concept of much more quickly and accurately setting up workpieces on work tables of one or more machine tools by securing the workpieces in a predetermined position on fixtures, which fixtures are then rigidly secured to the work tables by quick connect ball locks. The centers of one ball lock preferably acts as an indexing point for a tape or the like which controls the machining operations on the workpiece. One or more workpieces may be machined while its fixture remains secured to the work table of one machine to perform a particular machining function, and then the fixture and workpiece or pieces may be transferred as a unit and locked to the bed of one or more other machine tools with the tapes or floppy disks controlling the other machine tools being indexed with the same ball lock.

The second embodiment of the invention is directed to reducing the set up time for a multiple drilling head machine and includes a ball lock fixture clamping system as described in the previous paragraph and also includes a quick connect system for properly orienting drill spindles for performing the desired machining operation on one or more workpieces and for rapidly reducing the set up time from about 4 to 5 hours on small workpieces to about eight to 10 minutes when a plurality of drill spindles are used.

Although the best mode contemplated for carrying out the present invention has been herein shown and described, it will be apparent that modification and variation may be made without departing from what is regarded to be the subject matter of the invention.

What is claimed is:

1. In a work set up apparatus for use with at least one machine tool associate with a work table having an upper surface and a tool for performing work on a workpiece, comprising:
   means defining a plurality of precisely located workpiece positioning and clamping holes in said work table;
   means defining fixture having a plurality of precisely located mounting holes therein spaced predetermined distances apart and adapted to be aligned with associated ones of said positioning and clamping holes;
   means for supporting at least one workpiece at a predetermined location in said fixture; and
   a plurality of quick connect ball lock means insertable into selected ones of said plurality of holes for aligning and locking said fixture and workpiece to said table at a predetermined precise location.

2. An apparatus according to claim 1 wherein said quick connect means comprises said plurality of ball locks, each of said ball locks including a female portion generated about an axis and rigidly secured to associated ones of said workpiece positioning and clamping holes in said table, and a male portion inxertable into an associated female portion for firmly clamping the fixture to said table.

3. An apparatus according to claim 2 wherein operation of the machine tool is controlled by a tape and wherein the tape is indexed with the axis of a preselected one of said female portions of said ball locks for assuring that the machine tool performs the work at a desired location on the workpiece.

4. An apparatus according to claim 1 wherein said supporting means includes means secured to said fixture for clamping the workpiece in a precise position on said fixture.

5. An apparatus according to claim 2 wherein a plurality of said female portions are rigidly secured in counterbores in said work table and have upper surfaces substantially flush with a fixture contacting surface of the table.

6. An apparatus according to claim 2 wherein said work table has a top with T-slots therein, and additionally comprising a ball lock mounting plate having a top wall and having a plurality of counterbores therein within which said female portions are rigidly secured and are substantially flush with the top of said mounting plate, and means for rigidly securing said ball lock mounting plate to said T-slots.

7. An apparatus according to claim 3 wherein a minimum number of female portions are spaced varied distances apart for selectively supporting fixtures of different lengths on said table for accommodating workpieces of different lengths.

8. An apparatus according to claim 3 wherein a maximum error of a machining operation when performed on a series of substantially identical workpieces supported by the fixture is about 0.002 of an inch.

9. In a work set up apparatus for use with at least one machine tool associated with a work table having an upper surface and a tool for performing work on a workpiece, comprising:
   means defining a fixture having a plurality of mounting holes therein spaced predetermined distances apart;
   means for supporting at least one workpiece at a predetermined locafion on said fixture;
   quick connect means for locking said fixture to said table at a predetermined location;
   said quick connect means comprising a plurality of ball locks, each having a female portion generated about an axis and rigidly secured to said table, and a male portion insertable into an associated female portion for firmly clamping the fixture to said table;
   said work table having a plurality of T-slots therein, and additionally comprising a T-track transferring device fitted in said T-slots in said table: said T-track transfer device including a plurality of first balls, and means for moving upper surface of said first balls between positions above and below the upper surface of said table; when said fixture is supported on said balls, said fixture with a heavy workpiece thereon being easily moved into position to be locked to said table by said ball locks; and when said balls are below said upper surface of said table, said fixture being directly supported upon said work table and said ball locks being in position to be actuated to rigidly secure said fixture to said work table.

10. An apparatus according to claim 9 and additionally comprising a mobile cart having a mobile cart table with second T-slots therein, a second T-track transfer device fitted in said second T-slots, said second T-transfer device including a plurality of second balls having upper and lower positions, and means for moving upper surfaces of said second balls between positions above and below an upper surface of said cart table, said cart adapted to have a fixture with a heavy load secured thereto lowered onto said cart table at a remote location when said second balls are in their lowered position, said cart being movable into transfer position relative to said work table, said means for moving said first and second balls being actuated to move said first and second balls to said raised positions for more easily and quickly moving the fixture and its heavy load off said cart and into locking position on said machine tool work table.

11. An apparatus according to claim 9 wherein each of said means for moving upper surfaces of said first and second balls between positions above and below the upper surface of said table comprises; a horizontally movable slide in said T-slot, a plurality of inclined ramps formed on said slide and each ramp being adapted to support one of said balls, a cover plate secured in fixed position in said T-slot and having a plurality of generally frusto-conical holes therein with each hole adapted to receive one of said balls, and means for moving said slide in opposite directions for raising and lowering said balls.

12. An apparatus according to claim 9 wherein each of said T-track transfer devices comprise an elongated T-shaped bar slidably received in an associated T-slot, means defining an elongated channel formed in an upper surface of said T-shaped bar, means for removably locking said T-shaped bar in said associated T-slot, a horizontally movable slide bar in said channel, a plurality of inclined ramps formed on said slide bar and each ramp being adapted to support one of said balls, a cover plate secured in fixed position to said T-shaped bar and having a plurality of generally frusto-conical holes therein with each hole adapted to receive one of said balls, and means for moving said slide in opposite directions for raising or lowering said balls.

13. An apparatus according to claim 12 wherein said means for moving said slide comprises anchor means disposed in fixed position relative to said work table, an elongated adjustment bolt means screwed into said slide and rotatably received in said anchor means and held from axial movement relative thereto wherein said slide is moved in one direction to raise said balls to a fixture supporting position and is moved in the opposite direction to lower said ball below said upper surface of said work table upon first rotating said bolt means in one direction and thereafter in the opposite direction.

14. An apparatus according to claim 13 wherein said T-track transfer device may be removed from said work table by unscrewing said adjustment bolt means from said slide and moving said T-shape slide out of said T-slot.

15. A method of reducing the set up time for preparing a machine tool to perform work on a workpiece by firmly and accurately clamping a fixture to a work table having a plurality of lock receiving annuluses rigidly connected thereto, comprising the steps of:
   locating the workpiece in fixed position on a fixture having a plurality of mounting holes therein;
   supporting the fixture on said work table;
   aligning one mounting hole with one of said annuluses;
   inserting one lock in said one aligned hole and said one annulus;
   pivoting said fixture about said one lock for aligning other mounting holes with other ones of said lock receiving annuluses;
   inserting other locks in said other aligned mounting holes and annuluses; and
   firmly clamping said fixture to said table by actuating said one and said other locks for firmly clamping said fixture and workpiece to said work table in a predetermined position.

16. A method according to claim 15 wherein each of said locks are ball locks having a plurality of radially movable balls and an axially movable ball urged against said radial balls by an axially movable screw; said method additionally comprising the steps of tightening said axially movable means against said axially movable ball for urging said radial balls into locking engagement with said associated annuluses.

17. A method according to claim 16 wherein each of said annuluses includes a frusto-conical ball engaging surface and wherein each of said axially movable means is a screw means that is tightened by an actuating force of about 33 foot pounds to urge said radially movable balls against said ball engaging surface to provide a fixture clamping force of about 40,000 foot pounds for each fixture.

18. A method according to claim 17 wherein portions of the lower surface of said fixture are relieved for isolating most of said 40,000 foot pounds of clamping force of each ball lock to small areas of said fixtures adjacent the associated ball locks.

19. A method according to claim 15 wherein said fixture is adapted to be placed in direct contact with said machine tool table and with a second work table supported by a mobile cart, said work tables each having upper surfaces and a plurality of T-slots therein with a T-track transfer device fitted in each T-slot and each T-track having a plurality of vertically movable balls therein, said method additionally comprising the steps of:

loading a fixture with a heavy workpiece clamped thereon onto said cart table when said balls are at a level below the upper surface of said second work table;

moving the cart into abutting engagement with said machine tool work table;

raising the balls in each table to a position wherein portions of each ball are disposed above the upper surface of the associated work tables in fixture supporting position;

moving the fixture and its workpiece off said cart and onto said balls on said machine tool table;

aligning all mounting holes with associated ones of said annuluses while said fixture is supported on said balls;

inserting all ball locks into associated ones of said mounting holes and aligned annuluses, and lowering said balls in said machine tool table below the upper surface of said machine tool work table before clamping said fixture to said machine tool table with said ball locks.

20. A method according to claim 15 wherein said machine tool is a multiple drill head machine having a vertically movable head with a plurality of adjustable drill spindle drive means therein, said head having a drill and holding mechanism rigidly secured thereto with at least one drill head adapted to be removably attached thereto and adapted to removably carry a plurality of spindles spaced a desired distance apart and having cutting tools chucked therein, said method additionally comprising the steps of:

inserting a plurality of said drill spindles at the desired spacing in said drill head;

locking said drill spindles in fixed position in said head;

inserting said drill head in said drill head holding mechanism;

locking said drill head in fixed position in said drill head holding mechanism;

connecting said spindles to associated ones of said adjustable drill spindle drive means; and lowering the vertically movable head of said multiple drilling head machine for moving said cutting tool into cutting engagement with the workpiece.

* * * * *